(12) United States Patent
Mahasseni et al.

(10) Patent No.: US 11,593,982 B1
(45) Date of Patent: Feb. 28, 2023

(54) METHOD AND DEVICE FOR GENERATING A BLENDED ANIMATION

(71) Applicant: Apple Inc., Cupertino, CA (US)

(72) Inventors: Behrooz Mahasseni, San Jose, CA (US); Aashi Manglik, Sunnyvale, CA (US); Mark Drummond, Palo Alto, CA (US); Edward S. Ahn, San Francisco, CA (US); Shaun Budhram, San Jose, CA (US); Siva Chandra Mouli Sivapurapu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/557,273

(22) Filed: Dec. 21, 2021

Related U.S. Application Data

(60) Provisional application No. 63/134,381, filed on Jan. 6, 2021.

(51) Int. Cl.
*G06T 19/00* (2011.01)
*G06T 13/40* (2011.01)
*G06N 3/04* (2023.01)

(52) U.S. Cl.
CPC .............. *G06T 13/40* (2013.01); *G06N 3/04* (2013.01); *G06T 19/006* (2013.01)

(58) Field of Classification Search
None
See application file for complete search history.

(56) References Cited

U.S. PATENT DOCUMENTS 9,824,480 B2 11/2017 Geisner et al.
2009/0091563 A1 4/2009 Viz et al.

OTHER PUBLICATIONS

Zhao Wang, "Motion Capture Data Processing, Retrieval and Recognition," Doctoral Dissertation, Bournemouth University, 2018, pp. 1-204.
Seih Cooper et al., "Active Learning for Real-Time Motion Controllers," ACM Transactions on Graphics (TOG) 26.3 (2007): pp. 1-7.
Matthew Stone Rutgers et al., "Speaking with Hands: Creating Animated Conversational Characters from Recordings of Human Performance," ACM Transactions on Graphics (TOG) 23.3 (2004): pp. 506-513.

*Primary Examiner* — Nicholas R Wilson
(74) *Attorney, Agent, or Firm* — Fernando & Partners, LLP

(57) ABSTRACT

In one implementation, a method for generating a blended animation. The method includes: obtaining a motion input vector for a current time period; generating a motion output vector and pose information for the current time period based on the motion input vector; selecting an animated motion from a bank of animated motions for the current time period that matches the pose information within a threshold tolerance value; obtaining a blending coefficients vector for the current time period; generating a blended animation for the current time period by blending the motion output vector with the animated motion based on the blending coefficients vector; and generating a reward signal for the blended animation for the current time period.

25 Claims, 9 Drawing Sheets

METHOD AND DEVICE FOR GENERATING A BLENDED ANIMATION

CROSS-REFERENCE TO RELATED APPLICATIONS

This application claims the benefit of U.S. Provisional Patent Application No. 63/134,381, filed on Jan. 6, 2021, which is herein incorporated by reference in its entirety.

TECHNICAL FIELD

The present disclosure generally relates to animation and rendering and, in particular, to systems, devices, and methods for generating a blended animation.

BACKGROUND

A machine learning (ML) system may be able to output coarse joint positions/movements for animating a virtual agent. However, the ML system may not be capable of fine-grained movements, such as facial expressions and the like, which may instead be pre-authored or manually crafted.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
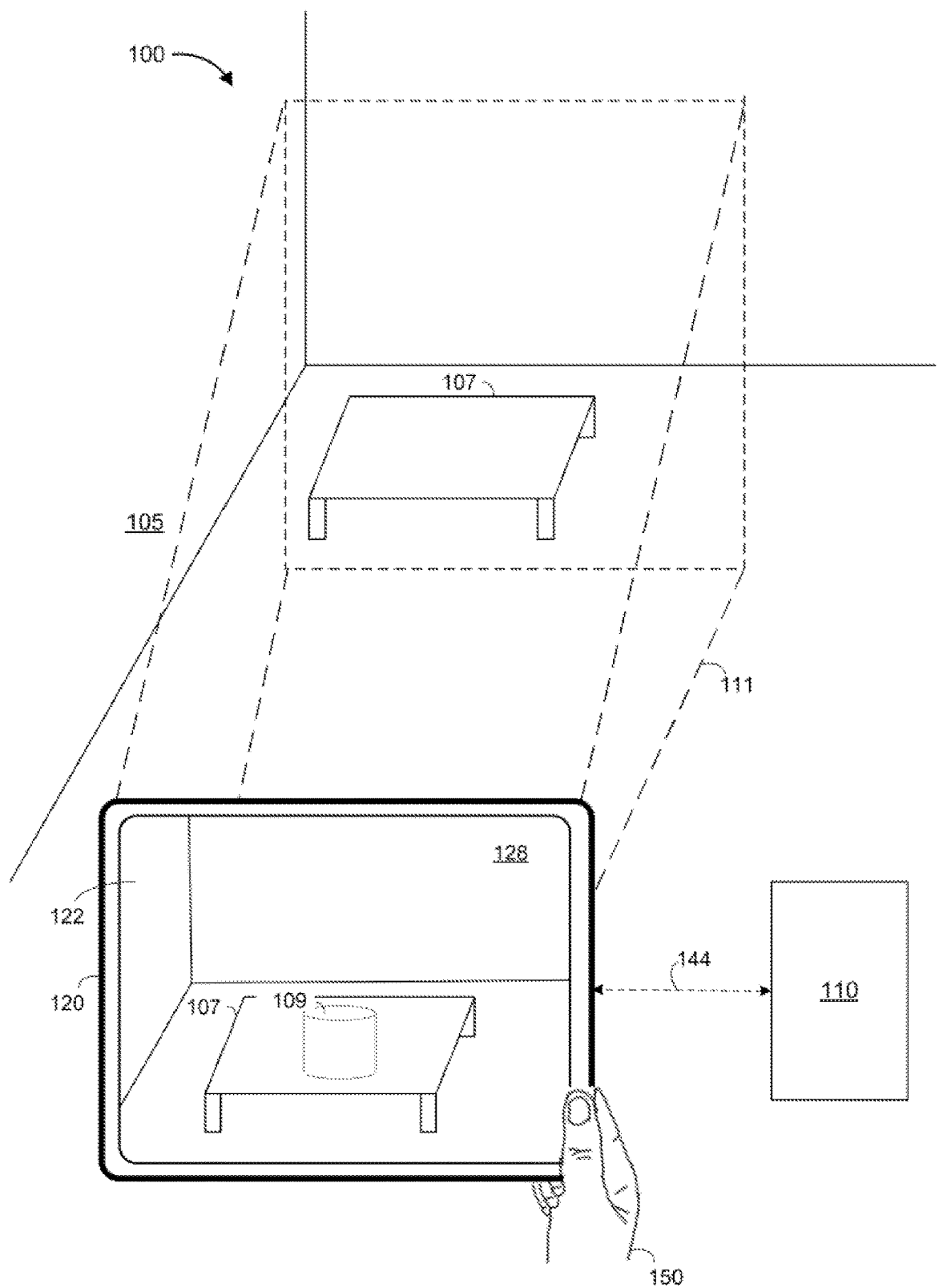
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for generating a blended animation. According to some implementations, the method is performed at a computing system including non-transitory memory and one or more processors, wherein the computing system is communicatively coupled to a display device and one or more input devices. The method includes: obtaining a motion input vector for a current time period; generating a motion output vector and pose information for the current time period based on the motion input vector; selecting an animated motion from a bank of animated motions for the current time period that matches the pose information within a threshold tolerance value; obtaining a blending coefficients vector for the current time period; generating a blended animation for the current time period by blending the motion output vector with the animated motion based on the blending coefficients vector; and generating a reward signal for the blended animation for the current time period.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
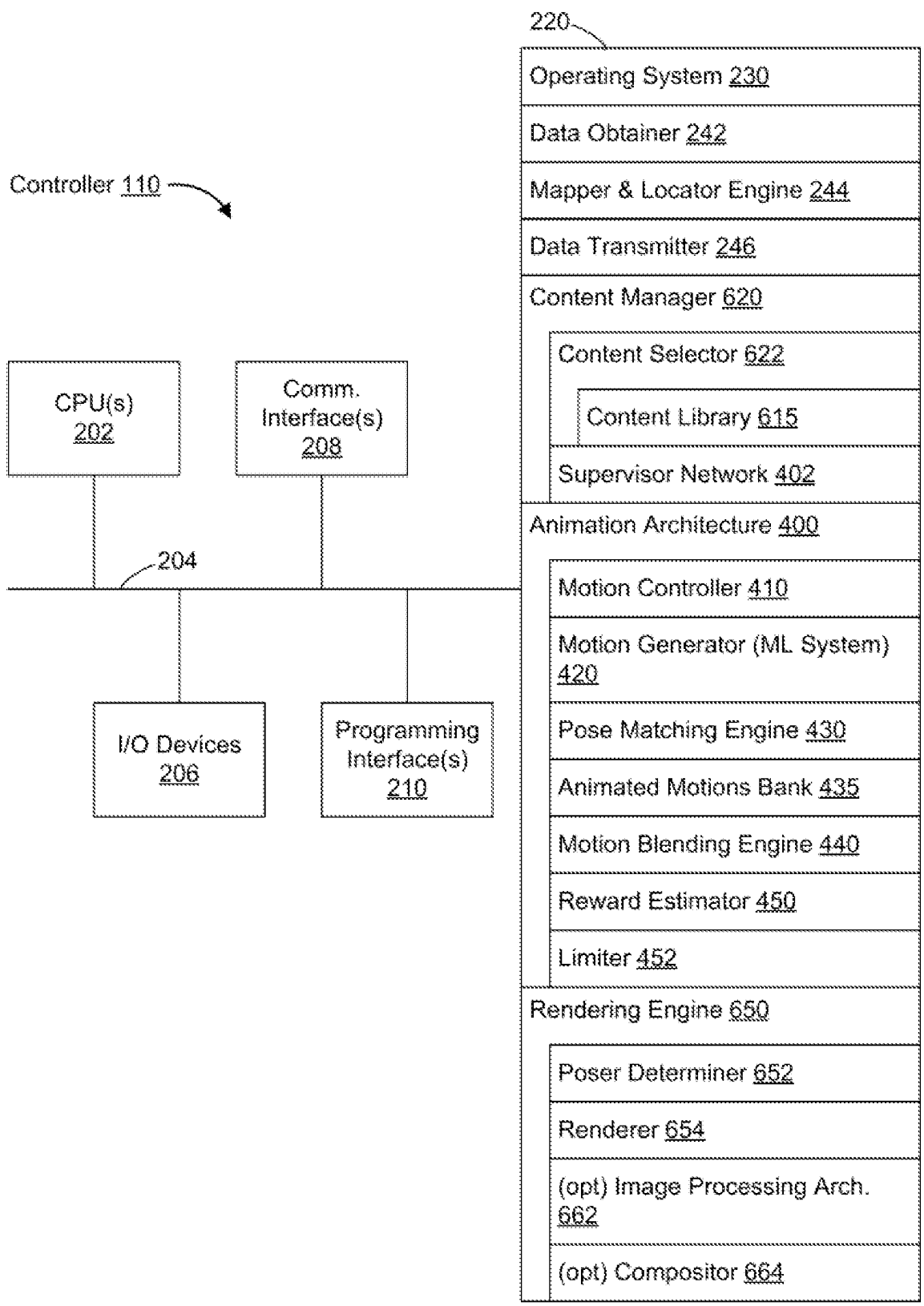
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, blended animation(s), etc.) to at least the electronic device 120 and optionally one or more other devices. To that end, in various implementations, the data transmitter 246 includes instructions and/or logic therefor, and heuristics and metadata therefor.

In some implementations, an animation architecture 400 is configured to generate a blended animation for a current time period or image frame by blending a motion output vector from the motion generator 420 with an animated motion selected from the animated motions bank 435 based on a blending coefficients vector from a motion controller 410. The animation architecture 400 is described in more detail below with reference to FIG. 4A. To that end, in various implementations, the animation architecture 400 includes instructions and/or logic therefor, and heuristics and metadata therefor. In some implementations, the animation architecture 400 includes a motion controller 410, a motion generator 420, a pose matching engine 430, an animated motions bank 435, a motion blending engine 440, a reward estimator 450, and a limiter 452.

In some implementations, the motion controller 410 is configured to generate a motion input vector that is fed to the motion generator 420 and a blending coefficients vector for the blended animation. The motion controller 410 is described in more detail below with reference to FIG. 4A. The motion input vector is described in more detail below with reference to FIG. 4B, and the blending coefficients vector is described in more detail below with reference to FIG. 4C.

In some implementations, the motion controller 410 is also configured to receive a reward signal associated with the quality of the blended animation for the current time period or image frame. In accordance with a determination that the reward signal for the blended animation does not satisfy a threshold value, the motion controller 410 adjusts one or more tunable parameters of the motion controller 410 for a subsequent time period. In accordance with a determination that the reward signal for the blended animation satisfies the threshold value, the motion controller 410 forgoes adjusting one or more tunable parameters of the motion controller 410. To that end, in various implementations, the motion controller 410 includes instructions and/or logic therefor, and heuristics and metadata therefor.

In some implementations, the motion generator 420 is configured to generate a motion output vector and pose information for the current time period or image frame based on the motion input vector. In some implementations, the motion generator 420 corresponds to a machine learning (ML) system such as a neural network (NN), a deep neural network (DNN), a convolutional neural network (CNN), a relevant vector machine (RVM), a support vector machine (SVM), a random forest algorithm, or the like. The motion generator 420 is described in more detail below with reference to FIG. 4A. The motion output vector is described in more detail below with reference to FIG. 4C. To that end, in various implementations, the motion generator 420 includes instructions and/or logic therefor, and heuristics and metadata therefor.

In some implementations, the pose matching engine 430 is configured to select or identify an animated motion from the animated motions bank 435 that matches the pose information within a threshold tolerance value. The pose matching engine 430 is described in more detail below with reference to FIG. 4A. To that end, in various implementations, the pose matching engine 430 includes instructions and/or logic therefor, and heuristics and metadata therefor.

In some implementations, the animated motions bank 435 includes a plurality of pre-existing animated motions. For example, a respective animated motion corresponds to one or more fine-grained facial expressions, body language poses, or the like. In some implementations, the animated motions bank 435 is pre-populated or manually authored by the user 150 or another user. In some implementations, the animated motions bank 435 is located local relative to the controller 110. In some implementations, the animated motions bank 435 is located remote from the controller 110 (e.g., at a remote server, a cloud server, or the like).

In some implementations, the motion blending engine 440 is configured to generate a blended motion for the current time period or image frame by blending the motion output vector with the animated motion selected from the animated motions bank 435 based on the blending coefficients vector. In some implementations, the motion blending engine 440 may perform linear blending, spatial blending, temporal blending, spatial-temporal blending, or the like. The motion blending engine 440 is described in more detail below with reference to FIG. 4A. To that end, in various implementations, the motion blending engine 440 includes instructions and/or logic therefor, and heuristics and metadata therefor.

In some implementations, the reward estimator 450 is configured to generate a reward signal (e.g., an animation quality score) for the blended animation for the current time period and send the reward signal to the motion controller 410. In some implementations, the reward signal for the blended animation corresponds to one or more of a smoothness factor, a jitter factor, and/or the like for the blended animation. The reward estimator 450 is described in more detail below with reference to FIG. 4A. To that end, in various implementations, the reward estimator 450 includes instructions and/or logic therefor, and heuristics and metadata therefor.

In some implementations, the limiter 452 is configured to identify motions within the blended animation that are outside of a predefined range (or tolerance) of motions and provide a feedback signal to the motion controller 410 associated therewith. The limiter 452 is described in more detail below with reference to FIG. 4A. To that end, in various implementations, the limiter 452 includes instructions and/or logic therefor, and heuristics and metadata therefor.

In some implementations, a content manager 620 is configured to manage and update the layout, setup, structure, and/or the like for the XR content selected by the content selector 622. The content manager 620 is described in more detail below with reference to FIG. 6. To that end, in various implementations, the content manager 540 includes instructions and/or logic therefor, and heuristics and metadata therefor. In some implementations, the content manager 620 includes a content selector 622 and the supervisor network 402.

In some implementations, the content selector 622 is configured to select XR content (sometimes also referred to herein as "graphical content" or "virtual content") from a content library 615 based on one or more user requests and/or inputs (e.g., a voice command, a selection from a user interface (UI) menu of XR content items, and/or the like). The content selector 622 is described in more detail below with reference to FIG. 6. To that end, in various implementations, the content selector 622 includes instructions and/or logic therefor, and heuristics and metadata therefor.

In some implementations, the content library 615 includes a plurality of content items such as audio/visual (A/V) content and/or XR content, objects, items, scenery, etc. As one example, the XR content includes 3D reconstructions of user captured videos, movies, TV episodes, and/or other XR content. In some implementations, the content library 615 is pre-populated or manually authored by the user 150. In some implementations, the content library 615 is located local relative to the controller 110. In some implementations, the content library 615 is located remote from the controller 110 (e.g., at a remote server, a cloud server, or the like).

In some implementations, the supervisor network 402 is configured to update and manage an XR environment for the user that includes the selected XR content performing the blended animation. For example, the blended animation may cause a virtual agent or other XR content to locomote with the XR environment. To that end, in various implementations, the supervisor network 402 includes instructions and/or logic therefor, and heuristics and metadata therefor.

In some implementations, a rendering engine 650 is configured to render a XR environment (sometimes also referred to herein as a "graphical environment" or "virtual environment") or image frame associated therewith that includes the blended animation. To that end, in various implementations, the rendering engine 650 includes instructions and/or logic therefor, and heuristics and metadata therefor. In some implementations, the rendering engine 650 includes a pose determiner 652, a renderer 654, an optional image processing architecture 662, and an optional compositor 664.

In some implementations, the pose determiner 652 is configured to determine a current camera pose of the electronic device 120 and/or the user 150 relative to the A/V content and/or XR content. The pose determiner 652 is described in more detail below with reference to FIG. 6. To that end, in various implementations, the pose determiner 652 includes instructions and/or logic therefor, and heuristics and metadata therefor.

In some implementations, the renderer 654 is configured to render the A/V content and/or the XR content including the blended animation according to the current camera pose relative thereto. The renderer 654 is described in more detail below with reference to FIG. 6. To that end, in various implementations, the renderer 654 includes instructions and/or logic therefor, and heuristics and metadata therefor.

In some implementations, the image processing architecture 662 is configured to obtain (e.g., receive, retrieve, or capture) an image stream including one or more images of the physical environment 105 from the current camera pose of the electronic device 120 and/or the user 150. In some implementations, the image processing architecture 662 is also configured to perform one or more image processing operations on the image stream such as warping, color correction, gamma correction, sharpening, noise reduction, white balance, and/or the like. The image processing architecture 662 is described in more detail below with reference to FIG. 6. To that end, in various implementations, the image processing architecture 662 includes instructions and/or logic therefor, and heuristics and metadata therefor.

In some implementations, the compositor 664 is configured to composite the rendered A/V content and/or XR content with the processed image stream of the physical environment 105 from the image processing architecture 662 to produce rendered image frames of the XR environment for display. The compositor 664 is described in more detail below with reference to FIG. 6. To that end, in various implementations, the compositor 664 includes instructions and/or logic therefor, and heuristics and metadata therefor.

Although the data obtainer 242, the mapper and locator engine 244, the data transmitter 246, the content manager 620, the animation architecture 400, and the rendering engine 650 are shown as residing on a single device (e.g., the controller 110), it should be understood that in other implementations, any combination of the data obtainer 242, the mapper and locator engine 244, the data transmitter 246, the content manager 620, the animation architecture 400, and the rendering engine 650 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
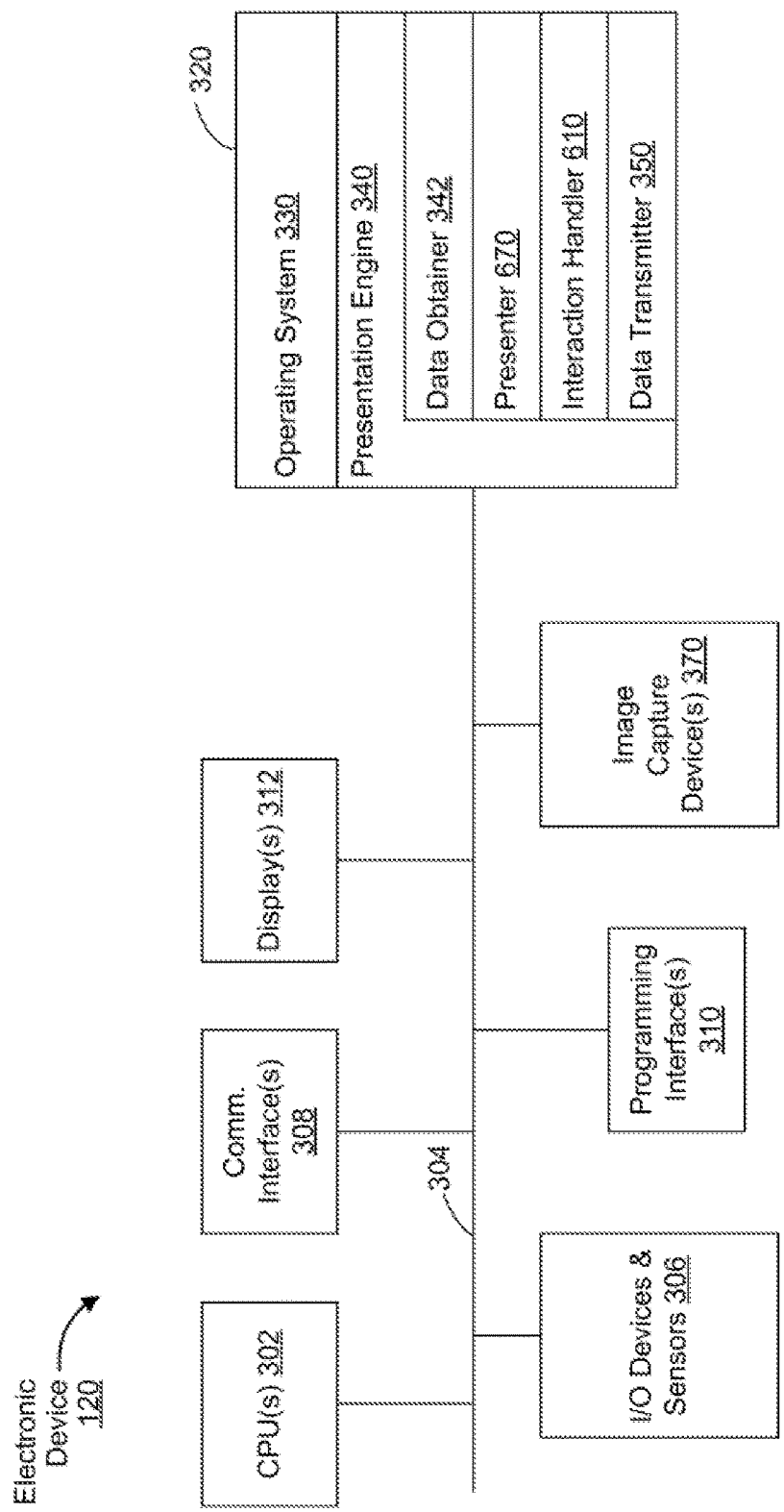
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 670, an interaction handler 610, and a data transmitter 350.

In some implementations, the data obtainer 342 is configured to obtain data (e.g., presentation data such as rendered image frames associated with the user interface or the XR environment, blended animation(s), input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 670 is configured to present and update A/V content and/or XR content (e.g., the rendered image frames associated with the user interface or the XR environment) via the one or more displays 312. To that end, in various implementations, the presenter 670 includes instructions and/or logic therefor, and heuristics and metadata therefor.

In some implementations, the interaction handler 610 is configured to detect user interactions with the presented A/V content and/or XR content (e.g., gestural inputs detected via hand tracking, eye gaze inputs detected via eye tracking, voice commands, etc.). To that end, in various implementations, the interaction handler 610 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the presenter 670, the interaction handler 610, and the data transmitter 350 are shown as residing on a single device (e.g., the electronic device 120), it should be understood that in other implementations, any combination of the data obtainer 342, the presenter 670, the interaction handler 610, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
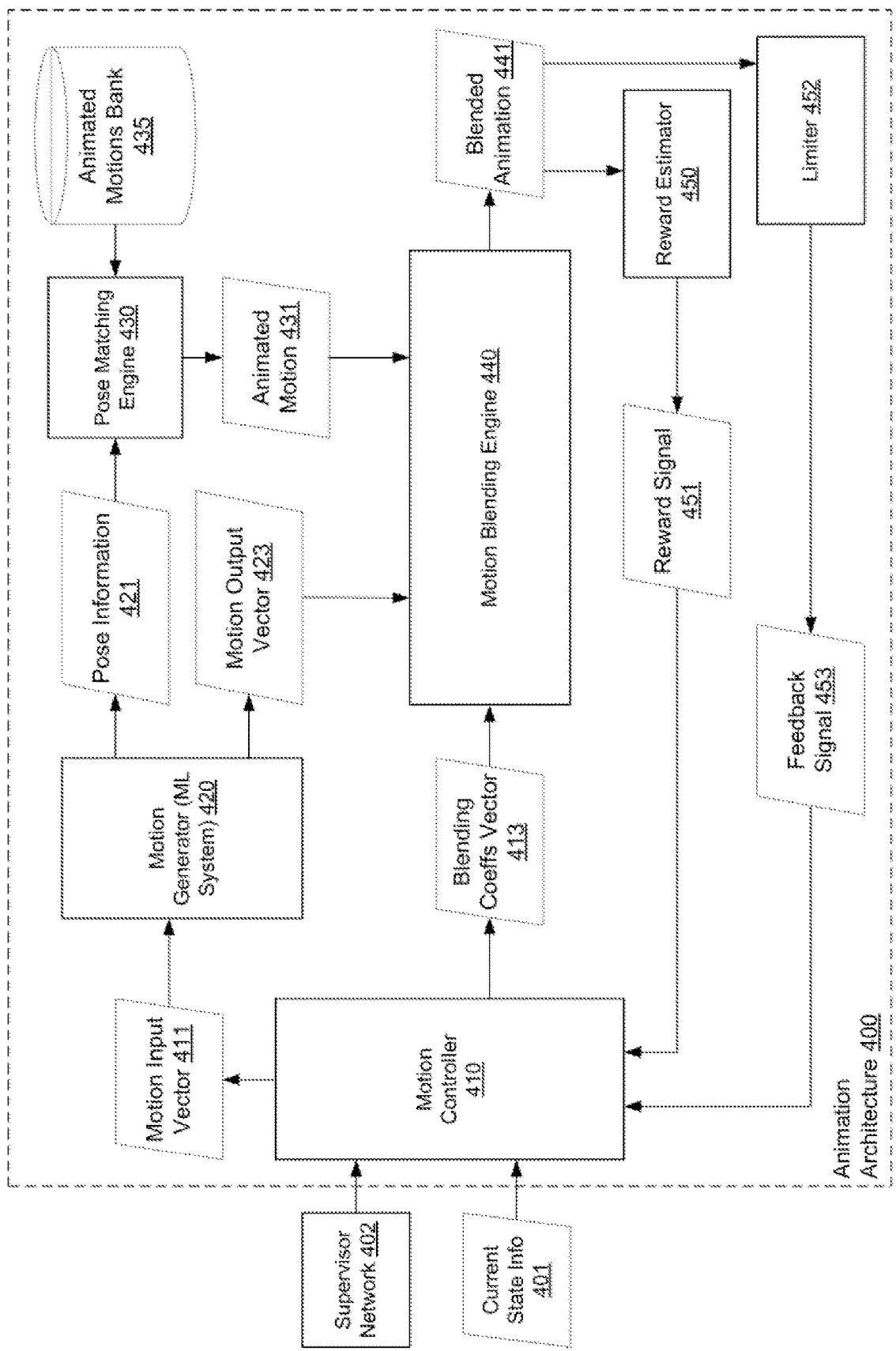
FIG. 4A is a block diagram of an example animation architecture in accordance with some implementations.

FIG. 4A is a block diagram of an example animation architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the animation architecture 400 is included in a computing system such as the controller 110 shown in FIGS. 1 and 2; the electronic device 120 shown in FIGS. 1 and 3; and/or a suitable combination thereof. In some implementations, the animation architecture 400 includes software, firmware, hardware, an application-specific integrated circuit (ASIC), a field-programmable gate array (FPGA), and/or the like.

As shown in FIG. 4A, the motion controller 410 is communicatively coupled with the supervisor network 402, which manages and updates an XR environment presented via the electronic device 120 to the user 150. In some implementations, the motion controller 410 generates a motion input vector 411 and a blending coefficients vector 413 for the current time period or image frame based on the current state information 401.

Figure 4B:
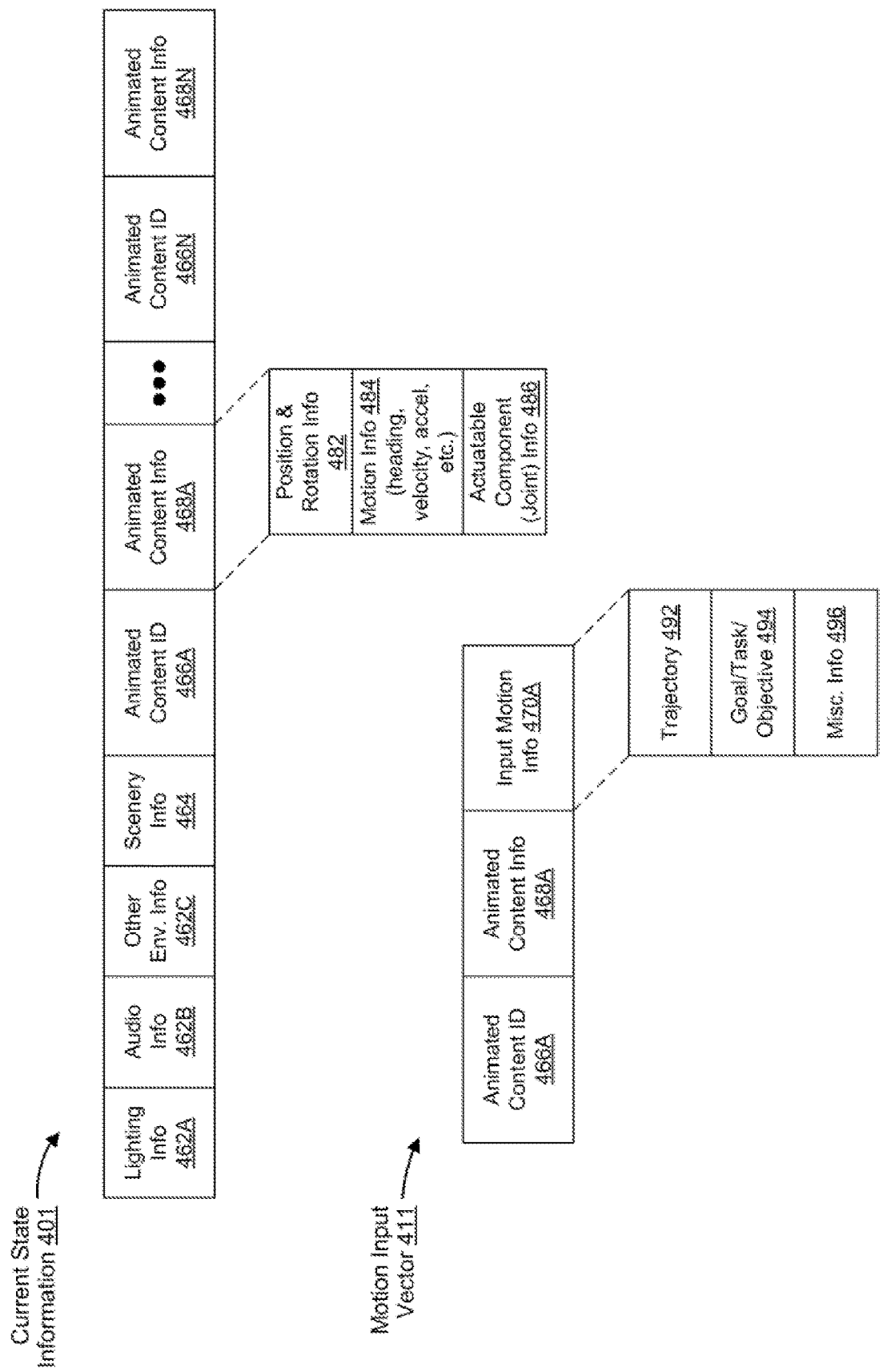
FIGS. 4B and 4C illustrate example data structures in accordance with some implementations.

FIG. 4B shows example data structures for the current state information 401 and the motion input vector 411 in accordance with some implementations. One of ordinary skill in the art will appreciate that the current state information 401 and the motion input vector 411 shown in FIG. 4B are example data structures that may be formatted differently and otherwise modified in various other implementations. According to some implementation, the current state information 401 describes the state of the XR environment at the end of the previous time period or image frame including any animated content portions. As shown in FIG. 4B, the current state information 401 includes: lighting information 462A associated with the XR environment, audio information 462B associated with the XR environment, other environmental information 462C associated with the XR environment (e.g., weather or other transient conditions in the XR environment), and scenery information 464 associated with the XR environment (e.g., identifiers for and/or information associated with stationary and/or non-animated XR content within the XR environment).

In FIG. 4B, the current state information 401 also includes one or more pairs of information for specific animated content within the XR environment. For example, the specific animated content corresponds to a virtual agent, an XR object, or the like within the XR environment that is animatable or otherwise enabled to translate and/or rotate. As such, a first pair of information includes an animated content identifier 466A for first animated content (e.g., a serial number or other identifier) and animated content information 468A for the first animated content. Another pair of information includes an animated content identifier 466N for Nth animated content and animated content information 468N for the Nth animated content. As shown in FIG. 4B, the animated content information 468A includes: position and rotation information 482 for the first animated content (e.g., translational and rotational values for the first animated content relative to the XR environment), motion information 484 for the first animated content (e.g., a current heading, a current velocity value, a current acceleration value, and/or the like for the first animated content), and actuatable component (joint) information 486 for the first animated content. For example, the actuatable component (joint) information 486 includes translational and rotational values for each actuatable component of the first animated content, classifiers associated with a type of each joint of the first animated content, current torque or the like values associated with each actuatable component of the first animated content, constraints associated with each actuatable component of the first animated content (e.g., load or stress limit values for each actuatable component, limited freedom of angular movement for each actuatable component, limited freedom of displacement for each actuatable component, etc.), and/or the like.

As shown in FIG. 4B, the motion input vector 411 includes the animated content identifier 466A and the animated content information 468A for first animated content as well as input motion information 470A for first animated content. In FIG. 4B, the input motion information 470A includes a trajectory 492 for first animated content, a goal/task/objective 494 for first animated content, and miscellaneous information 496 for first animated content. One of ordinary skill in the art will appreciate that multiple instances of animated content may be managed in parallel for a respective time period or image frame. Thus, although the motion input vector 411 refers to a single instance of animated content, one of ordinary skill in the art will appreciate the motion input vector 411 may include additional information when managing multiple instances of animated content.

Figure 4C:
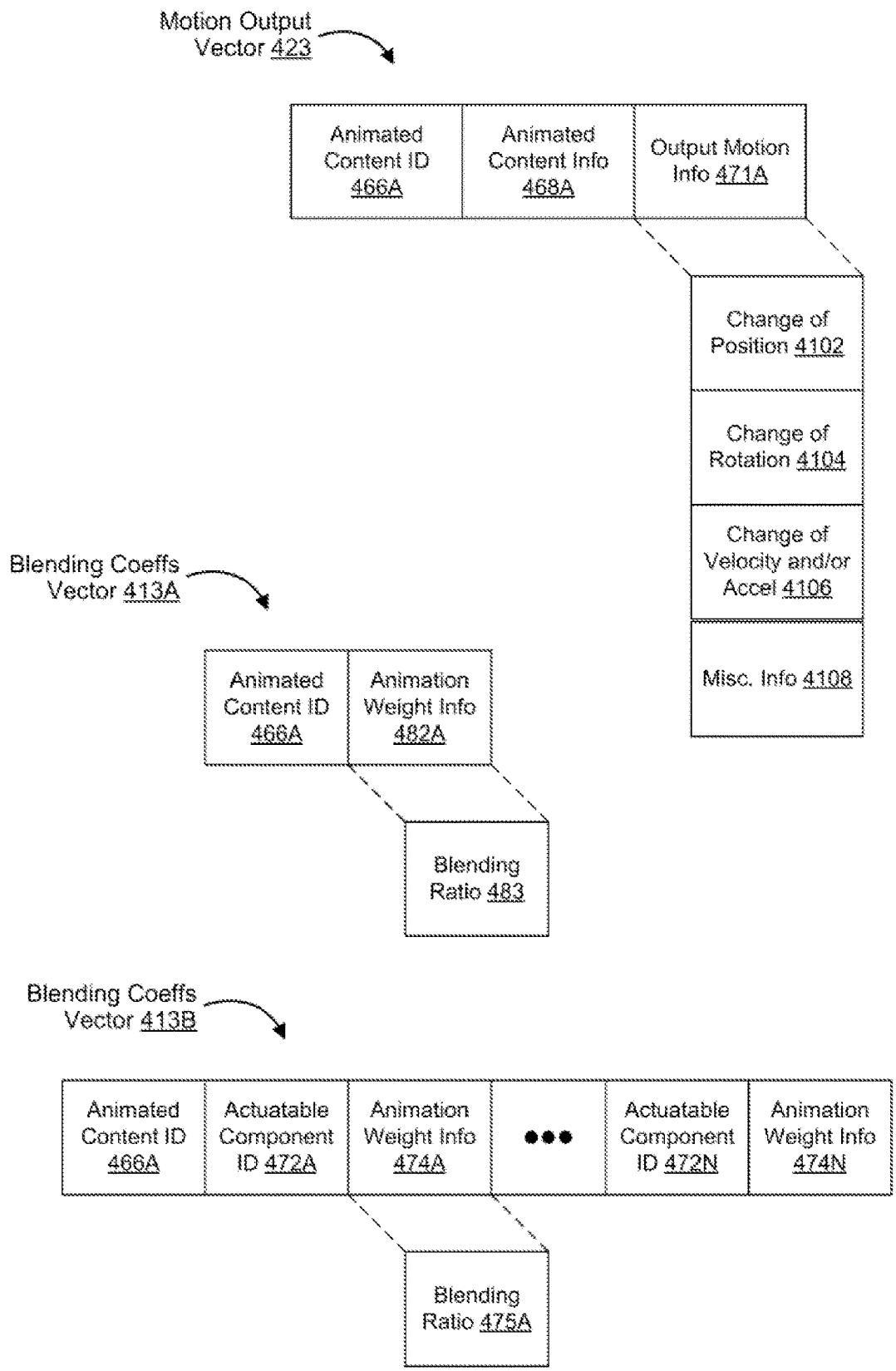

FIG. 4C shows example alternative data structures for blending coefficients vectors 413A and 413B according to some implementations. One of ordinary skill in the art will appreciate that the blending coefficients vectors 413A and 413B shown in FIG. 4C are example data structures that may be formatted differently and otherwise modified in various other implementations. As shown in FIG. 4C, the blending coefficients vector 413A includes the animated content identifier 466A and an overall animation weight information 482A, including a blending ratio 483 specifying the weights given to the motion output vector 423 and the animated motion 431 for the motion blending process performed by the motion blending engine 440. In this example, the overall animation weight information 482A relates to the animated content as a whole (e.g., a virtual agent or other XR content identified by the animated content identifier 466A).

As shown in FIG. 4C, the blending coefficients vector 413B includes the animated content identifier 466A and actuatable component specific animation weights. In FIG. 4C, the blending coefficients vector 413B includes pairs of information on an actuatable component basis. For example, a first pair of information including an actuatable component identifier 472A (e.g., a serial number or other identifier) for a first actuatable component of the animated content and animation weight information 474A for a first actuatable component of the animated content, and an Nth pair of information including an actuatable component identifier 472N (e.g., a serial number or other identifier) for the Nth actuatable component of the animated content and animation weight information 474N for the Nth actuatable component of the animated content. For example, the animation weight information 474A includes a blending ratio 475A specifying the weights given to the motion output vector 423 and the animated motion 431 with respect to the actuatable component 472A for the motion blending process performed by the motion blending engine 440. In some implementations, the blending ratios 483 and 475A are predetermined, tunable, deterministic, pseudo-random, or the like. One of ordinary skill in the art will appreciate that the blending coefficients vectors 413A and 413B relate to different implementations where motion blending may occur on a whole animated content basis or on an actuatable component basis.

As shown in FIG. 4A, the motion generator 420 generates pose information 421 and a motion output vector 423 based on the motion input vector 411 from the motion controller 410. In some implementations, the motion generator 420 corresponds to an ML system such as an NN, a DNN, a CNN, a RVM, an SVM, a random forest algorithm, or the like. In some implementations, the pose information 421 includes positional and/or translational information for the overall animated content. In some implementations, the pose information 421 includes positional and/or translational information for each actuatable component (e.g., a joint, a limb, a body segment, or the like) of the animated content.

FIG. 4C shows example data structures for the motion output vector 423 in accordance with some implementations. One of ordinary skill in the art will appreciate that the motion output vector 423 shown in FIG. 4C is an example data structure that may be formatted differently and otherwise modified in various other implementations. As shown in FIG. 4C, the motion output vector 423 includes the animated content identifier 466A and the animated content information 468A for first animated content as well as output motion information 471A for first animated content. In FIG. 4C, the output motion information 471A includes a change of position 4102, a change of rotation 4104, a change of velocity and/or acceleration 4106, and miscellaneous information 4108 for first animated content. For example, the output motion information 471A may be associated with the whole of the first animated content or individual actuatable components (e.g., joints, limbs, body segments, or the like) of the first animated content. One of ordinary skill in the art will appreciate that multiple instances of animated content may be managed in parallel for a respective time period or image frame. Thus, although the motion output vector 423 refers to a single instance of animated content, one of ordinary skill in the art will appreciate the motion output vector 423 may include additional information when managing multiple instances of animated content.

As shown in FIG. 4A, the pose matching engine 430 selects or identifies an animated motion 431 from the animated motions bank 435 for the current time period or image frame that matches the pose information 421 within a threshold tolerance value (e.g., X mm for positional values within the pose information 421, and Y° for rotational values within the pose information 421, or the like).

As shown in FIG. 4A, the motion blending engine 440 generates a blended animation 441 for the current time period or image frame by blending the motion output vector 423 with the animated motion 431 selected from the animated motions bank 435 based on the blending coefficients vector 413. For example, as described above, the blending coefficients vector 413 includes a blending ratio with weights for the motion output vector 423 and the animated motion 431. In some implementations, the motion blending engine 440 performs linear blending, spatial blending, temporal blending, spatial-temporal blending, or the like to generate the blended animation 441.

As shown in FIG. 4A, the reward estimator 450 generates a reward signal 451 (e.g., an animation quality score) for the blended animation 441 for the current time period. In some implementations, the reward estimator 450 may include a reward function adjustor mechanism for adjusting the reward function that produces the reward signal 451.

As shown in FIG. 4A, the limiter 452 identifies motions within the blended animation 441 that are outside of a predefined range (or tolerance) of motions and generates a feedback signal 453 associated therewith. As one example, if the blended animation 441 includes an action that is outside of a predefined set of actions available to the animated content, the limiter 452 may stop the action from occurring or recommend an alternative action. As another example, if the blended animation 441 includes a motion that involves a positional displacement, an angular movement, or the like that is outside of a pre-defined range of motion, the limiter 452 may stop the motion from occurring or recommend a scaled-back motion that is within the pre-defined range of motion.

As shown in FIG. 4A, the motion controller 410 receives the reward signal 451 associated with the quality of the blended animation 441 for the current time period or image frame. In accordance with a determination that the reward signal 451 for the blended animation 441 does not satisfy a threshold value, the motion controller 410 adjusts one or more tunable parameters of the motion controller 410 (e.g., the blending coefficients vector 413, the motion input vector 411, and/or the like) for a subsequent time period. In accordance with a determination that the reward signal 451 for the blended animation 441 satisfies the threshold value, the motion controller 410 forgoes adjusting one or more tunable parameters of the motion controller 410.

Figure 5:
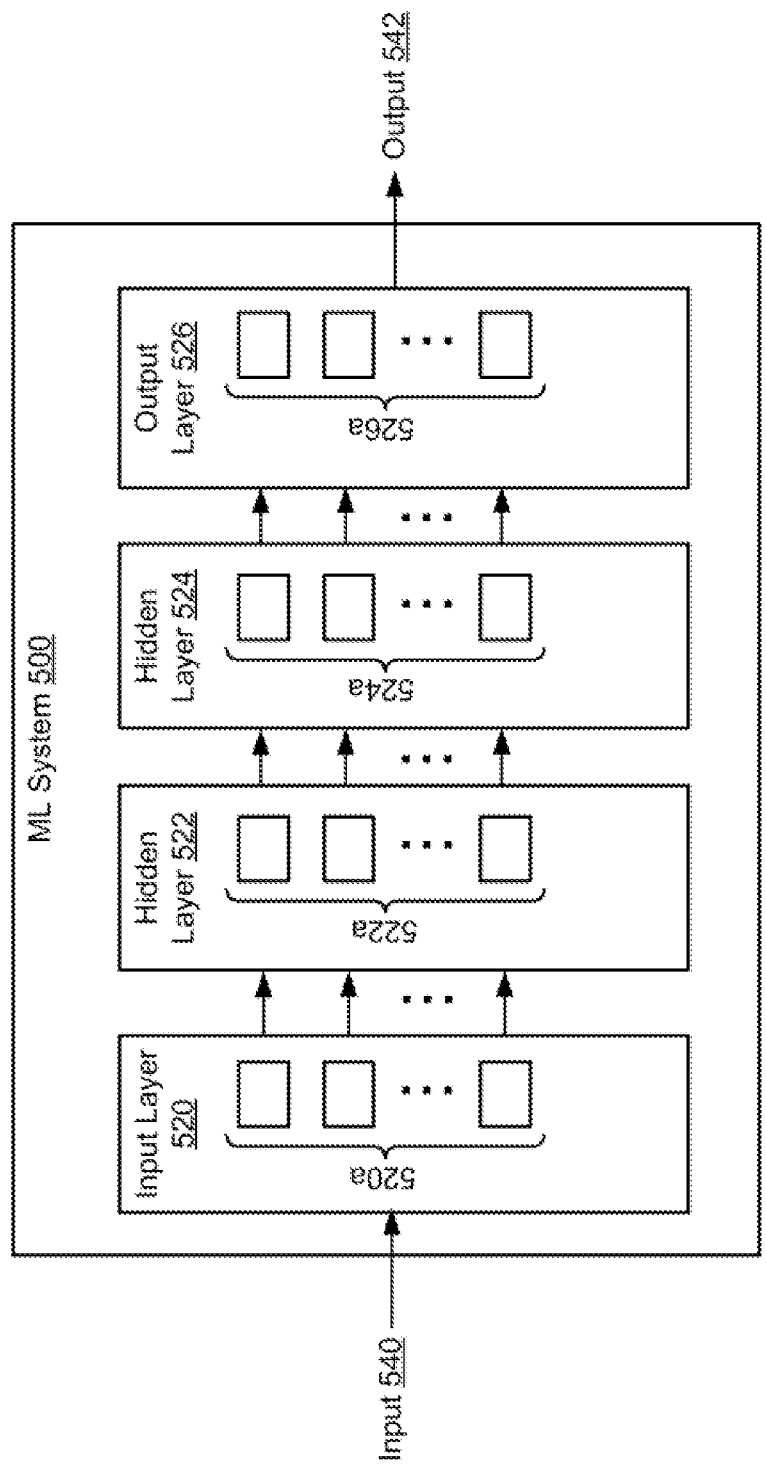
FIG. 5 is a block diagram of an example neural network in accordance with some implementations.

FIG. 5 is a block diagram of an example neural network 500 according to some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the neural network 500 may correspond to the motion generator 420 in FIGS. 2 and 4A. To that end, as a non-limiting example, in some implementations, the neural network 500 includes an input layer 520, a first hidden layer 522, a second hidden layer 524, and an output layer 526. While the neural network 500 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 520 is coupled (e.g., configured) to receive an input 540. For example, with reference to FIG. 4A, the input 540 corresponds to the motion input vector 411 from the motion controller 410. In various implementations, the input layer 520 includes a number of long short-term memory (LSTM) logic units 520a or the like, which are also referred to as model(s) of neurons by those of ordinary skill in the art. In some such implementations, an input matrix from the features to the LSTM logic units 520a include rectangular matrices. For example, the size of this matrix is a function of the number of features included in the feature stream.

In some implementations, the first hidden layer 522 includes a number of LSTM logic units 522a or the like. As illustrated in the example of FIG. 5, the first hidden layer 522 receives its inputs from the input layer 520. For example, the first hidden layer 522 performs one or more of following: a convolutional operation, a nonlinearity operation, a normalization operation, a pooling operation, and/or the like.

In some implementations, the second hidden layer 524 includes a number of LSTM logic units 524a or the like. In some implementations, the number of LSTM logic units 524a is the same as or similar to the number of LSTM logic units 520a in the input layer 520 or the number of LSTM logic units 522a in the first hidden layer 522. As illustrated in the example of FIG. 5, the second hidden layer 524 receives its inputs from the first hidden layer 522. Additionally, and/or alternatively, in some implementations, the second hidden layer 524 receives its inputs from the input layer 520. For example, the second hidden layer 524 performs one or more of following: a convolutional operation, a nonlinearity operation, a normalization operation, a pooling operation, and/or the like.

In some implementations, the output layer 526 includes a number of LSTM logic units 526a or the like. In some implementations, the number of LSTM logic units 526a is the same as or similar to the number of LSTM logic units 520a in the input layer 520, the number of LSTM logic units 522a in the first hidden layer 522, or the number of LSTM logic units 524a in the second hidden layer 524. In some implementations, the output layer 526 is a task-dependent layer that performs motion related tasks. In some implementations, the output layer 526 includes an implementation of a multinomial logistic function (e.g., a soft-max function) that produces an output 542. For example, with reference to FIG. 4A, the output 542 corresponds to the pose information 421 and the motion output vector 423.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 6:
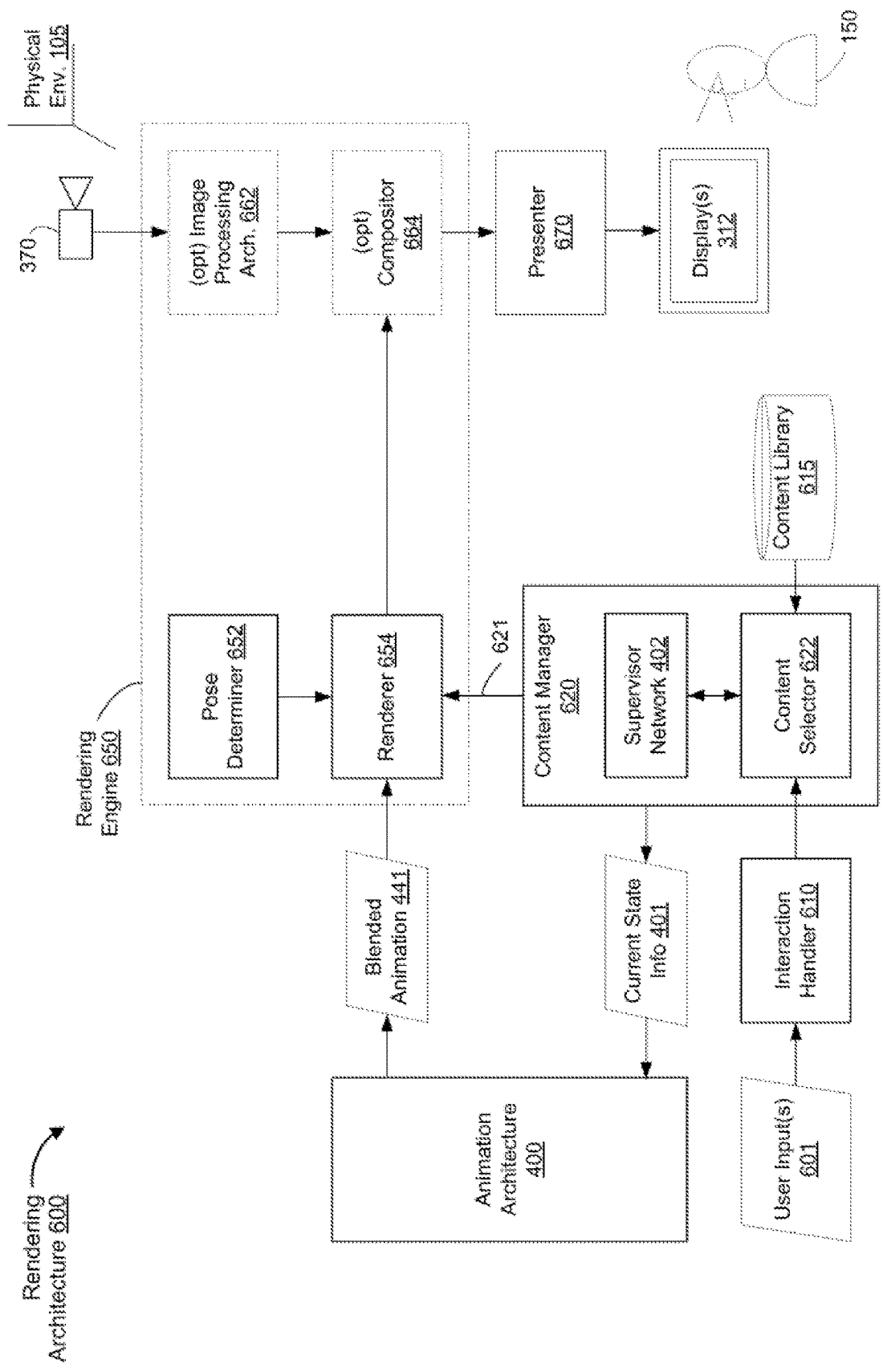
FIG. 6 is a block diagram of an example rendering architecture in accordance with some implementations.

FIG. 6 is a block diagram of an example rendering architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content rendering architecture 600 is included in a computing system such as the controller 110 shown in FIGS. 1 and 2; the electronic device 120 shown in FIGS. 1 and 3; and/or a suitable combination thereof. In some implementations, the rendering architecture 600 includes software, firmware, hardware, an application-specific integrated circuit (ASIC), a field-programmable gate array (FPGA), and/or the like.

As shown in FIG. 6, the interaction handler 610 obtains (e.g., receives, retrieves, or detects) one or more user inputs 601 provided by the user 150 that are associated with selecting A/V content and/or XR content for presentation. For example, the one or more user inputs 601 correspond to a gestural input selecting XR content from a UI menu detected via hand tracking, an eye gaze input selecting XR content from the UI menu detected via eye tracking, a voice command selecting XR content from the UI menu detected via a microphone, and/or the like. In some implementations, the content selector 622 selects XR content 621 from the content library 615 based on one or more user inputs 601 (e.g., a voice command, a selection from a menu of XR content items, and/or the like). For example, the XR content 621 corresponds to a virtual agent, an XR object, or the like within the XR environment that is animatable or otherwise enabled to translate and/or rotate.

In various implementations, the content manager 620 or a component thereof (e.g., the supervisor network 402) manages and updates the layout, setup, structure, and/or the like of the XR environment as the animation architecture 400 animates the XR content 621. As a result, the content manager 620 or a component thereof (e.g., the supervisor network 402) updates the current state information 401 and provides the current state information 401 to the animation architecture 400. According to some implementations, as described above with reference to FIG. 4A, the animation architecture 400 generates a blended animation 441 associated with the XR content 621 for a current time period or image frame based at least in part on the current state information 401.

According to some implementations, the pose determiner 652 determines a current camera pose of the electronic device 120 and/or the user 150 relative to the XR content 621 and/or the physical environment 105. In some implementations, the renderer 654 renders the XR content 621 performing the blended animation 441 according to the current camera pose relative thereto.

According to some implementations, the optional image processing architecture 662 obtains an image stream from an image capture device 370 including one or more images of the physical environment 105 from the current camera pose of the electronic device 120 and/or the user 150. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered XR content with the processed image stream of the physical environment 105 from the image processing architecture 662 to produce rendered image frames of the XR environment. In various implementations, the presenter 670 presents the rendered image frames of the XR environment to the user 150 (e.g., via the one or more displays 312 of the electronic device 120). One of ordinary skill in the art will appreciate that the optional image processing architecture 662 and the optional compositor 664 may not be applicable for fully virtual environments (or optical see-through scenarios).

Figure 7:
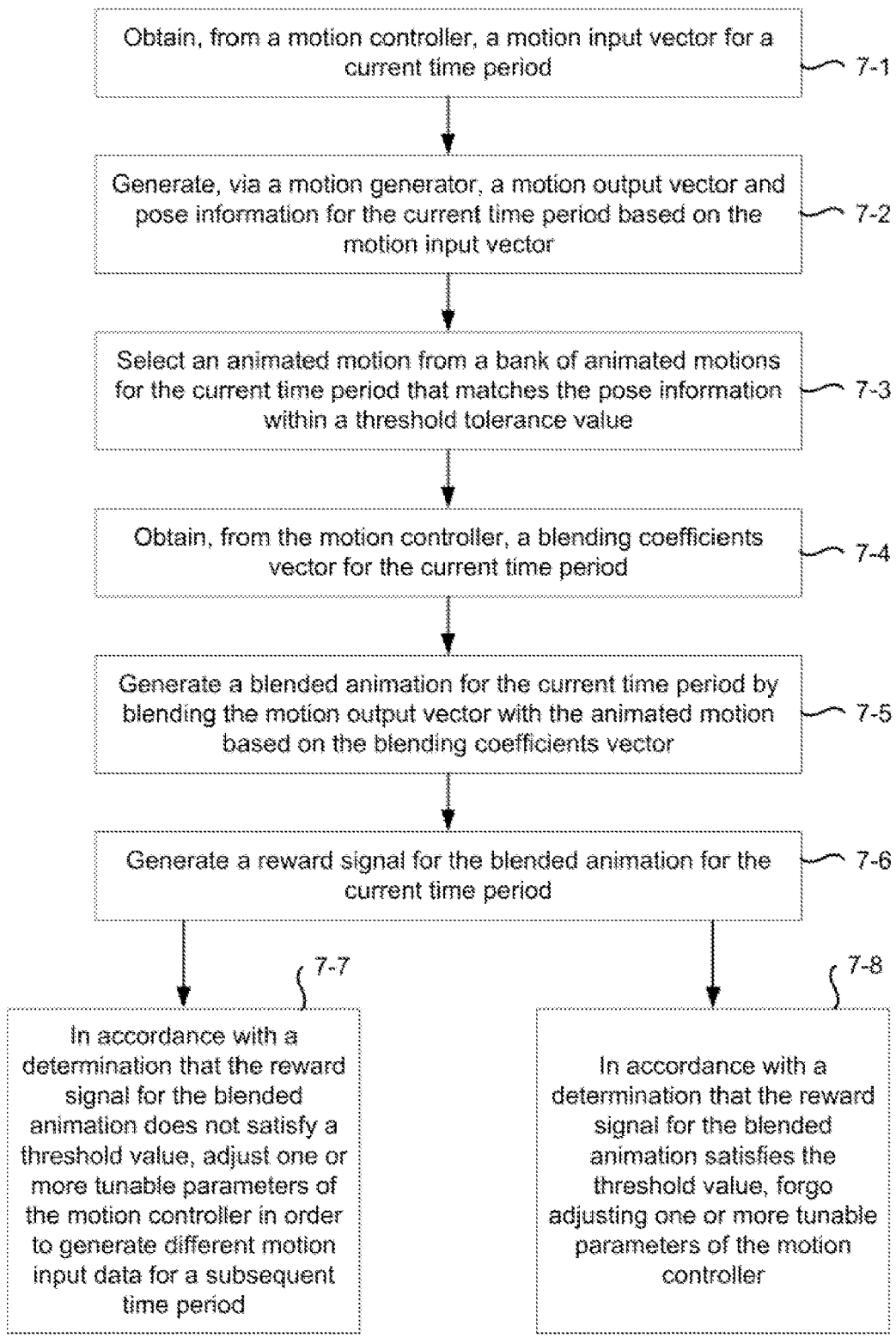
FIG. 7 is a flowchart representation of a method of generating a blended animation in accordance with some implementations.

FIG. 7 is a flowchart representation of a method 700 of generating a blended animation in accordance with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the computing system includes the animation architecture 400 in FIG. 4A and the rendering architecture 600 in FIG. 6. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, a machine learning (ML) system may be able to output coarse joint positions/movements for animating a virtual agent. However, the ML system may not be capable of fine-grained movements, such as facial expressions and the like, which may instead be pre-authored or manually crafted. As such, in some implementations, a computing system blends motion outputs from a motion generator (e.g., an ML system) with manually crafted motion outputs on a frame-by-frame basis. The computing system also generates a reward signal (e.g., an animation quality score) for the blended animation based on the smoothness thereof. The computing system also perturbs a motion controller that provides the input(s) to the motion generator based on the reward signal in order to improve future blended animations. In other words, the computing system trains (or adjusts) the motion controller to generate quality animations that blend motion outputs from an ML system with manually crafted animations.

As represented by block 7-1, the method 700 includes obtaining, from a motion controller (e.g., the motion controller 410 in FIGS. 2 and 4A), a motion input vector for a current time period. With reference to FIG. 4A, the animation architecture 400 or a component thereof (e.g., the motion controller 410) generates a motion input vector for the current time period or image frame. FIG. 4B, for example, illustrates the motion input vector 411. In some implementations, the motion input vector includes at least one of a task, an objective, a goal, position information, or rotation information for particular extended reality (XR) content. In some implementations, the particular XR content corresponds to one of a virtual agent or an animatable XR object.

As represented by block 7-2, the method 700 includes generating, via a motion generator (e.g., the motion generator 420 in FIGS. 2 and 4A), a motion output vector and pose information for the current time period based on the motion input vector. In some implementations, the motion generator corresponds to a machine learning (ML) system. For example, the motion ML system corresponds to an NN, a DNN, a CNN, a RVM, an SVM, a random forest algorithm, or the like.

With reference to FIG. 4A, the animation architecture 400 or a component thereof (e.g., the motion generator 420) generates a motion output vector 423 and pose information 421 for the current time period or image frame based on the motion input vector. FIG. 4C, for example, illustrates the motion output vector 423. In some implementations, the motion output vector includes at least one of a change of position, a change of rotation, a change of velocity, or a change of acceleration for particular XR content.

In some implementations, the motion output vector includes at least one of a change of position, a change of rotation, a change of velocity, or a change of acceleration for actuatable components of particular XR content. In some implementations, the actuatable components corresponds to one of a joint, a limb, or a body segment of the particular XR content.

As represented by block 7-3, the method 700 includes selecting an animated motion from a bank of animated motions for the current time period that matches the pose information within a threshold tolerance value. With reference to FIG. 4A, the animation architecture 400 or a component thereof (e.g., the pose matching engine 430) selects or identifies an animated motion 431 from the animated motions bank 435 that matches the pose information 421 within a threshold tolerance value. In some implementations, the animated motion selected from the bank of animated motions includes at least one of a fine-grained facial expression or a fine-grained body pose. For example, the animated motion includes fine-grained motions for body language purposes or the like.

As represented by block 7-4, the method 700 includes obtaining, from the motion controller (e.g., the motion controller 410 in FIGS. 2 and 4A), a blending coefficients vector for the current time period. With reference to FIG. 4A, the animation architecture 400 or a component thereof (e.g., the motion controller 410) generates a blending coefficients vector 413 for the current time period or image frame. In some implementations, the blending coefficients vector includes weights for the motion output vector and the animated motion. In some implementations, the blending coefficients vector includes weights for the motion output vector and the animated motion for each actuatable component.

FIG. 4C shows example alternative data structures for blending coefficients vectors 413A and 413B according to some implementations. One of ordinary skill in the art will appreciate that the blending coefficients vectors 413A and 413B shown in FIG. 4C are example data structures that may be formatted differently and otherwise modified in various other implementations. As shown in FIG. 4C, the blending coefficients vector 413A includes the animated content identifier 466A and an overall animation weight information 482A, which specifies a blending ratio 483 specifying the weights given to the motion output vector 423 and the animated motion 431 for the motion blending process performed by the motion blending engine 440. As shown in FIG. 4C, the blending coefficients vector 413B includes the animated content identifier 466A and actuatable component specific animation weights.

As represented by block 7-5, the method 700 includes generating a blended animation for the current time period by blending the motion output vector with the animated motion based on the blending coefficients vector. With reference to FIG. 4A, the animation architecture 400 or a component thereof (e.g., the motion blending engine 440) generates a blended animation 441 for the current time period or image frame by blending the motion output vector 423 with the animated motion 431 selected from the animated motions bank 435 based on the blending coefficients vector 413. For example, as described above, the blending coefficients vector 413 includes a blending ratio with weights for the motion output vector 423 and the animated motion 431. In some implementations, the blended animation is generated based on one of a linear blending technique, a spatial blending technique, a temporal blending technique, or a spatial-temporal blending technique.

In some implementations, the method 700 includes presenting, via the display device, the particular XR content performing the blended animation. For example, with reference to FIG. 6, the computing system or a component thereof (e.g., the content selector 622) obtains (e.g., receives, retrieves, etc.) XR content 621 from the content library 615 based on one or more user inputs 601 (e.g., selecting the XR content 621 from a menu of XR content items). Continuing with this example, the computing system or a component thereof (e.g., the pose determiner 652) determines a current camera pose of the electronic device 120 and/or the user 150 relative to an origin location for the XR content 621. Continuing with this example, the computing system or a component thereof (e.g., the renderer 654) renders the XR content 621 performing the blended animation 441 according to the current camera pose relative thereto. According to some implementations, the pose determiner 652 updates the current camera pose in response to detecting translational and/or rotational movement of the electronic device 120 and/or the user 150. Continuing with this example, in video pass-through scenarios, the computing system or a component thereof (e.g., the compositor 664) obtains (e.g., receives, retrieves, etc.) one or more images of the physical environment 105 captured by the image capture device 370 and composites the rendered XR content 621 with the one or more images of the physical environment 105 to produce one or more rendered image frames. Finally, the computing system or a component thereof (e.g., the A/V presenter 670) presents or causes presentation of the one or more rendered image frames (e.g., via the one or more displays 312 or the like). One of ordinary skill in the art will appreciate that the operations of the optional compositor 664 may not be applicable for fully virtual environments or optical see-through scenarios.

In some implementations, the display device corresponds to a transparent lens assembly, and wherein the XR content is projected onto the transparent lens assembly. In some implementations, the display device corresponds to a near-eye system, and wherein presenting the XR content includes compositing the XR content with one or more images of a physical environment captured by an exterior-facing image sensor.

As represented by block 7-6, the method 700 includes generating a reward signal (e.g., an animation quality score) for the blended animation for the current time period. With reference to FIG. 4A, the animation architecture 400 or a component thereof (e.g., the reward estimator 450) generates a reward signal 451 (e.g., an animation quality score) for the blended animation 441 for the current time period or image frame. In some implementations, the reward estimator 450 may include a reward function adjustor mechanism for adjusting the reward function that produces the reward signal 451. In some implementations, the reward signal for the blended animation corresponds to one or more of a smoothness factor or a jitter factor. In some implementations, the reward signal for the blended animation is generated based on a predefined reward function.

In some implementations, as represented by blocks 7-7 and 7-8, the method 700 further includes: in accordance with a determination that the reward signal for the blended animation does not satisfy a threshold value, adjusting one or more tunable parameters of the motion controller for a subsequent time period; and in accordance with a determination that the reward signal for the blended animation satisfies the threshold value, forgoing adjusting one or more tunable parameters of the motion controller. For example, as shown in FIG. 4A, the animation architecture 400 or a component thereof (e.g., the motion controller 410) receives the reward signal 451 associated with the quality of the blended animation 441 for the current time period or image frame. In accordance with a determination that the reward signal 451 for the blended animation 441 does not satisfy a threshold value, the animation architecture 400 or a component thereof (e.g., the motion controller 410) adjusts one or more tunable parameters of the motion controller 410 (e.g., in order to modify the blending coefficients vector 413, the motion input vector 411, and/or the like) for a subsequent time period. In accordance with a determination that the reward signal 451 for the blended animation 441 satisfies the threshold value, the animation architecture 400 or a component thereof (e.g., the motion controller 410) forgoes adjusting one or more tunable parameters of the motion controller 410.

In some implementations, the method 700 further includes: identifying at least one portion of the blended animation that exceeds a motion limit; providing a feedback signal to the motion controller that identifies the at least one identified portion of the blended animation; and adjusting one or more tunable parameters of the motion controller based on the feedback signal associated with the blended animation.

In some implementations, the method 700 further includes: identifying at least one portion of the blended animation that exceeds a motion limit; providing a feedback signal to the motion controller that identifies the at least one identified portion of the blended animation; and adjusting, via the motion controller, the at least one identified portion of the blended animation based on the feedback signal. For example, as shown in FIG. 4A, the animation architecture 400 or a component thereof (e.g., the limiter 452) identifies motions within the blended animation 441 that are outside of a predefined range (or tolerance) of motions and generates a feedback signal 453 associated therewith. As one example, if the blended animation 441 includes an action that is outside of a predefined set of actions available to the animated content, the limiter 452 may stop the action from occurring or recommend an alternative action. As another example, if the blended animation 441 includes a motion that involves a positional displacement, an angular movement, or the like that is outside of a pre-defined range of motion, the limiter 452 may stop the motion from occurring or recommend a scaled-back motion that is within the pre-defined range of motion.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device and one or more input devices:
      obtaining a motion input vector for a current time period;
      generating a motion output vector and pose information for the current time period based on the motion input vector;
      selecting an animated motion from a bank of animated motions for the current time period that matches the pose information within a threshold tolerance value;
      obtaining a blending coefficients vector for the current time period;
      generating a blended animation for the current time period by blending the motion output vector with the animated motion based on the blending coefficients vector; and
      generating a reward signal for the blended animation for the current time period.

2. The method of claim 1, further comprising:
   in accordance with a determination that the reward signal for the blended animation does not satisfy a threshold value, adjusting one or more tunable parameters for a subsequent time period; and
   in accordance with a determination that the reward signal for the blended animation satisfies the threshold value, forgoing adjusting one or more tunable parameters.

3. The method of claim 1, wherein the motion output vector and the pose information for the current time period are generated via a machine learning system.

4. The method of claim 1, wherein the motion input vector includes at least one of a task, an objective, a goal, a position information, or rotation information for particular extended reality (XR) content.

5. The method of claim 4, wherein the particular XR content corresponds to one of a virtual agent or an animatable XR object.

6. The method of claim 4, further comprising:
   presenting, via the display device, the particular XR content performing the blended animation.

7. The method of claim 6, wherein the display device corresponds to a transparent lens assembly, and wherein the particular XR content is projected onto the transparent lens assembly.

8. The method of claim 6, wherein the display device corresponds to a near-eye system, and wherein presenting particular XR content includes compositing particular XR content with one or more images of a physical environment captured by an exterior-facing image sensor.

9. The method of claim 1, wherein the motion output vector includes at least one of a change of position, a change of rotation, a change of velocity, or a change of acceleration for particular extended reality (XR) content.

10. The method of claim 1, wherein the motion output vector includes at least one of a change of position, a change of rotation, a change of velocity, or a change of acceleration for actuatable components of particular extended reality (XR) content.

11. The method of claim 10, wherein the actuatable components corresponds to one of a joint, a limb, or a body segment of the particular XR content.

12. The method of claim 1, wherein the reward signal for the blended animation corresponds to one or more of a smoothness factor or a jitter factor.

13. The method of claim 1, wherein the reward signal for the blended animation is generated based on a predefined reward function.

14. The method of claim 1, wherein the animated motion includes at least one of a fine-grained facial expression or a fine-grained body pose.

15. The method of claim 1, wherein the blending coefficients vector includes weights for the motion output vector and the animated motion.

16. The method of claim 1, wherein the blending coefficients vector includes weights for the motion output vector and the animated motion for each actuatable component.

17. The method of claim 1, wherein the blended animation is generated based on one of a linear blending technique, a spatial blending technique, a temporal blending technique, or a spatial-temporal blending technique.

18. The method of claim 1, further comprising:
   identifying at least one portion of the blended animation that exceeds a motion limit;
   providing a feedback signal that identifies the at least one identified portion of the blended animation; and
   adjusting one or more tunable parameters based on the feedback signal associated with the blended animation.

19. The method of claim 1, further comprising:
   identifying at least one portion of the blended animation that exceeds a motion limit;
   providing a feedback signal that identifies the at least one identified portion of the blended animation; and
   adjusting the at least one identified portion of the blended animation based on the feedback signal.

20. A device comprising:
   one or more processors;
   a non-transitory memory;
   an interface for communicating with a display device and one or more input devices; and
   one or more programs stored in the non-transitory memory, which, when executed by the one or more processors, cause the device to:
      obtain a motion input vector for a current time period;
      generate a motion output vector and pose information for the current time period based on the motion input vector;
      select an animated motion from a bank of animated motions for the current time period that matches the pose information within a threshold tolerance value;
      obtain a blending coefficients vector for the current time period;

generate a blended animation for the current time period by blending the motion output vector with the animated motion based on the blending coefficients vector; and generate a reward signal for the blended animation for the current time period.

21. The device of claim 20, wherein the one or more programs further cause the device to:

in accordance with a determination that the reward signal for the blended animation does not satisfy a threshold value, adjust one or more tunable parameters for a subsequent time period; and in accordance with a determination that the reward signal for the blended animation satisfies the threshold value, forgo adjusting one or more tunable parameters.

22. The device of claim 20, wherein the one or more programs further cause the device to:

identify at least one portion of the blended animation that exceeds a motion limit;

provide a feedback signal that identifies the at least one identified portion of the blended animation; and adjust one or more tunable parameters based on the feedback signal associated with the blended animation.

23. A non-transitory memory storing one or more programs, which, when executed by one or more processors of a device with an interface for communicating with a display device and one or more input devices, cause the device to:

obtain a motion input vector for a current time period;

generate a motion output vector and pose information for the current time period based on the motion input vector;

select an animated motion from a bank of animated motions for the current time period that matches the pose information within a threshold tolerance value;

obtain a blending coefficients vector for the current time period;

generate a blended animation for the current time period by blending the motion output vector with the animated motion based on the blending coefficients vector; and generate a reward signal for the blended animation for the current time period.

24. The non-transitory memory of claim 23 wherein the one or more programs further cause the device to:

in accordance with a determination that the reward signal for the blended animation does not satisfy a threshold value, adjust one or more tunable parameters for a subsequent time period; and in accordance with a determination that the reward signal for the blended animation satisfies the threshold value, forgo adjusting one or more tunable parameters.

25. The non-transitory memory of claim 23, wherein the one or more programs further cause the device to:

identify at least one portion of the blended animation that exceeds a motion limit;

provide a feedback signal that identifies the at least one identified portion of the blended animation; and adjust one or more tunable parameters based on the feedback signal associated with the blended animation.

\* \* \* \* \*